(12) United States Patent
Kim et al.

(10) Patent No.: US 9,735,451 B2
(45) Date of Patent: Aug. 15, 2017

(54) BATTERY MODULE HAVING TEMPERATURE SENSOR AND BATTERY PACK EMPLOYED WITH THE SAME

(75) Inventors: Minjung Kim, Suwon-si (KR); Jinkyu Lee, Busan (KR); Dal Mo Kang, Daejeon (KR); Hee Soo Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/274,864

(22) Filed: Oct. 17, 2011

(65) Prior Publication Data

US 2012/0088135 A1 Apr. 12, 2012

Related U.S. Application Data

(63) Continuation of application No. PCT/KR2010/006253, filed on Sep. 14, 2010.

(30) Foreign Application Priority Data

Sep. 15, 2009 (KR) ........................ 10-2009-0086832

(51) Int. Cl.
*H01M 10/48* (2006.01)
*H01M 10/50* (2006.01)
(Continued)

(52) U.S. Cl.
CPC ......... *H01M 10/486* (2013.01); *H01M 2/206* (2013.01); *H01M 10/613* (2015.04); *H01M 10/647* (2015.04); *H01M 10/6555* (2015.04)

(58) Field of Classification Search
CPC ...... H01M 10/48; H01M 10/50; H01M 2/206; H01M 10/486; H01M 10/613; H01M 10/6555; H01M 10/647
See application file for complete search history.

(56) References Cited

U.S. PATENT DOCUMENTS 7,097,934 B2 8/2006 Shigeta et al.
7,479,786 B2 1/2009 Woo et al.
(Continued)

FOREIGN PATENT DOCUMENTS

CN 1435909 A 8/2003
EP 1 333 521 A2 8/2003
(Continued)

OTHER PUBLICATIONS

International Search Report for International Patent Application No. PCT/KR2010/006253, mailed on Jun. 3, 2011.
(Continued)

*Primary Examiner* — Barbara Gilliam
*Assistant Examiner* — Angela Martin
(74) *Attorney, Agent, or Firm* — Birch, Stewart, Kolasch & Birch, LLP

(57) ABSTRACT

Disclosed herein is a battery module including two or more battery cells, wherein the battery module is configured in a structure in which a sensor (a "temperature sensor") to measure the temperature of at least one of the battery cells is disposed between the at least one of the battery cells and a corresponding member contacting the at least one of the battery cells, the corresponding member is provided at a region thereof contacting the at least one of the battery cells with a groove formed in a shape corresponding to the temperature sensor, and the temperature sensor is disposed in contact with the outside of the at least one of the battery cells in a state in which the temperature sensor is mounted in the groove.

13 Claims, 10 Drawing Sheets

(51) Int. Cl.
*H01M 10/613* (2014.01)
*H01M 10/6555* (2014.01)
*H01M 10/647* (2014.01)
*H01M 2/20* (2006.01)

(56) References Cited

U.S. PATENT DOCUMENTS

| | | | |
|---|---|---|---|
| 7,582,386 B2* | 9/2009 | Takami et al. | 429/231.1 |
| 2003/0162084 A1* | 8/2003 | Shigeta et al. | 429/62 |
| 2006/0028183 A1* | 2/2006 | Izawa et al. | 320/150 |
| 2006/0091891 A1* | 5/2006 | Woo | H01M 10/482 324/430 |
| 2007/0120526 A1 | 5/2007 | Kumeuchi et al. | |
| 2009/0029251 A1* | 1/2009 | Baba | 429/209 |
| 2009/0284230 A1* | 11/2009 | Goma | 320/152 |
| 2011/0076550 A1* | 3/2011 | Liang et al. | 429/175 |

FOREIGN PATENT DOCUMENTS

| | | | | |
|---|---|---|---|---|
| JP | 2002-50411 A | | 2/2002 | |
| JP | 2005-347152 A | | 12/2005 | |
| JP | 2007-173223 A | | 7/2007 | |
| JP | 2008-270122 A | | 11/2008 | |
| JP | 2009-81301 A | | 4/2009 | |
| JP | 2009-087583 | * | 4/2009 | ........... H01M 10/44 |
| JP | 2009-87583 A | | 4/2009 | |
| KR | 2003-0065380 A | | 8/2003 | |
| KR | 1020060039377 | * | 5/2006 | ........... H01M 10/48 |
| KR | 10-0801635 A | | 2/2008 | |
| KR | 1020080042965 A | | 5/2008 | |
| WO | WO 2006-067903 | * | 6/2006 | ............. H01M 2/10 |
| WO | WO 2006/067903 A1 | | 6/2006 | |
| WO | WO 2009/057894 A1 | | 5/2009 | |

OTHER PUBLICATIONS

Extended European Search Report, dated Oct. 22, 2013, for European Application No. 10817393.1.

Japanese Office Action, dated Nov. 5, 2013, for Japanese Application No. 2012-528752.

* cited by examiner

600

BATTERY MODULE HAVING TEMPERATURE SENSOR AND BATTERY PACK EMPLOYED WITH THE SAME

This application is a By-Pass Continuation application of international application no. PCT/KR2010/006253 filed on Sep. 14, 2010, which claims the benefit under 35 U.S.C. §119(a) to Patent Application No. 10-2009-0086832 filed in the Republic of Korea, on Sep. 15, 2009. The entire contents of all of the above applications are hereby incorporated by reference.

TECHNICAL FIELD

The present invention relates to a battery module having a temperature sensor and a battery pack including the same, and, more particularly, to a battery module including two or more battery cells, wherein the battery module is configured in a structure in which a sensor (a "temperature sensor") to measure the temperature of at least one of the battery cells is disposed between the at least one of the battery cells and a corresponding member contacting the at least one of the battery cells, the corresponding member is provided at a region thereof contacting the at least one of the battery cells with a groove formed in a shape corresponding to the temperature sensor, and the temperature sensor is disposed in contact with the outside of the at least one of the battery cells in a state in which the temperature sensor is mounted in the groove and a middle or large-sized battery pack including the same.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

That is, if the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Also, in such a cooling system, the temperatures of the battery cells are measured so as to control cooling efficiency, and therefore, temperature sensors are needed.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a battery cartridge, and a plurality of battery cartridges is stacked to constitute a battery module. Coolant channels may be defined between the stacked battery cells or between the stacked battery modules so that temperature sensors are mounted between the stacked battery cells or between the stacked battery modules without difficulty and heat accumulating between the stacked battery cells or between the stacked battery modules is effectively removed.

In this structure, however, it is necessary to provide a plurality of coolant channels corresponding to the number of the battery cells with the result that the overall size of the battery module is increased.

Also, in a case in which a plurality of battery cells is stacked, the intervals of the coolant channels are relatively narrowed in consideration of the size of the battery module. As a result, design of the cooling structure is complicated. That is, high pressure loss is caused by the coolant channels arranged at intervals narrower than a coolant inlet port with the result that it is difficult to design shapes and positions of the coolant inlet port and a coolant outlet port. Also, a fan may be further provided to prevent such pressure loss, and therefore, design may be restricted due to power consumption, fan noise, space or the like.

Consequently, the structure of the battery module in which a plurality of heat dissipation members is disposed at two or more interfaces between the battery cells may be considered so as to manufacture the battery module that provides high power and large capacity in a simple and compact structure.

In this structure, however, direct contact between the battery cells and the heat dissipation members may be difficult when the temperature sensors are directly mounted to the sides of the battery cells while being located between the battery cells and the heat dissipation members with the result that cooling efficiency may be lowered.

Also, in the above structure in which the temperature sensors are mounted, load concentrates on the positions at which the temperature sensors are mounted when external force is applied to the battery module with the result that the temperature sensors may be deformed or damaged, and therefore, it may be not possible to correctly measure the temperatures of the battery cells.

Consequently, there is a high necessity for a battery module which provides high power and large capacity, which can be manufactured in a simple and compact structure, which exhibits excellent cooling efficiency, in which temperature sensors are not deformed and damaged, and which exhibits excellent life span and safety.

DISCLOSURE

Technical Problem

Therefore, the present invention has been made to solve the above problems, and other technical problems that have yet to be resolved.

Specifically, it is an object of the present invention to provide a battery module configured in a structure in which a temperature sensor is mounted in the groove formed at a corresponding member corresponding to a battery cell, thereby preventing load from concentrating on a position at which the temperature sensor is mounted while maintaining the contact area between the battery cell and the corresponding member, thereby preventing the temperature sensor from being deformed and damaged.

Technical Solution

In accordance with one aspect of the present invention, the above and other objects can be accomplished by the provision of a battery module including two or more battery cells, wherein the battery module is configured in a structure in which a sensor (a "temperature sensor") to measure the temperature of at least one of the battery cells is disposed between the at least one of the battery cells and a corresponding member contacting the at least one of the battery cells, the corresponding member is provided at a region thereof contacting the at least one of the battery cells with a groove formed in a shape corresponding to the temperature sensor, and the temperature sensor is disposed in contact with the outside of the at least one of the battery cells in a state in which the temperature sensor is mounted in the groove.

In the battery module according to the present invention, the temperature sensor is mounted in the groove formed at the region of the corresponding member contacting the battery cell in the shape corresponding to the temperature sensor. Consequently, it is possible to stably mount the temperature sensor in the groove of the corresponding member and to prevent load from concentrating on the position at which the temperature sensor is mounted, thereby effectively preventing the temperature sensor from being deformed and damaged by external force.

Also, in the structure in which the temperature sensor is mounted in the groove of the corresponding member in a state in which the temperature sensor is in contact with the outside of the battery cell, it is possible to increase the direct contact area between the battery cell and the corresponding member and thus correctly measure the temperature of the battery cell as compared with the conventional structure in which the temperature sensor is mounted in a space defined between the battery cell and the corresponding member.

The structure of the groove formed at the corresponding member is not particularly restricted so long as the groove is formed in a shape corresponding to the temperature sensor. For example, the groove may be configured in a depression type structure in which the temperature sensor is exposed only at a region of the corresponding member contacting the battery cell or a through type structure in which the temperature sensor is exposed at a region of the corresponding member opposite to the battery cell as well as the region of the corresponding member contacting the battery cell.

Also, the temperature sensor may be mounted in the groove in various manners. For example, the temperature sensor may be completely received in the groove so that the temperature sensor is not pressed by the battery cell. Alternatively, the temperature sensor may be mounted in the groove in a state in which a portion of the temperature sensor protrude from the groove so that the temperature sensor is not deformed even when the temperature sensor is pressed by the battery cell.

In a preferred example, the corresponding member may include a heat dissipation member mounted at an interface between the corresponding battery cells. As compared with the conventional structure in which the temperature sensor is mounted in a space defined between the battery cell and the corresponding member, it is possible to increase the contact area between the battery cell and the corresponding member and thus correctly measure the temperature of the battery cell, thereby maximizing cooling efficiency of the battery module.

Meanwhile, the structure of the heat dissipation member is not particularly restricted so long as the heat dissipation is easily achieved by the heat dissipation member. Preferably, the heat dissipation member is configured in a cooling fin structure.

Also, the material for the heat dissipation member is not particularly restricted so long as the heat dissipation member is formed of a thermally conductive material. For example, the heat dissipation member may be formed of a metal sheet exhibiting high thermal conductivity. The heat dissipation members may be disposed at all of the interfaces between the battery cells or at some of the interfaces between the battery cells. For example, in a case in which the heat dissipation members are disposed at all of the interfaces between the battery cells, the respective battery cells may be in contact with different heat dissipation members at opposite sides thereof. On the other hand, in a case in which the heat dissipation members are disposed at some of the interfaces between the battery cells, some of the battery cells may be in contact with the heat dissipation members only at one side thereof.

The temperature sensor may be located at any region of the battery cell so long as the temperature sensor measures the temperature of the battery cell. In consideration of the overall temperature state of the battery cell, it may be easy to set the temperature of the battery cell at the center region thereof to an average value. Preferably, therefore, the groove is formed at the corresponding member so that the temperature sensor is located at the center region of the at least one of the battery cells.

The temperature sensor is connected to a controller (for example, a battery management system (BMS)) to control the temperature of the battery module based on temperature information obtained from the temperature sensor. The groove, in which the temperature sensor is mounted, may extend so that a member, such as a wire, for such electrical connection is mounted in the groove extension.

Preferably, the groove extension is formed in the longitudinal direction opposite to the thermal conduction direction.

That is, in a case in which the groove extension is formed so as to traverse the thermal conduction direction, heat conductivity is lowered, and therefore, a heat dissipation effect is lowered. Preferably, therefore, the groove extension is formed in the longitudinal direction opposite to the thermal conduction direction.

Preferably, the heat dissipation member is disposed at the interface between the corresponding battery cells in a state in which at least a portion of the heat dissipation member is exposed outward from the stacked battery cells, and the outwardly exposed portion of the heat dissipation member is bent toward one side of the at least one of the battery cells.

In the above structure, the outwardly exposed portion of the heat dissipation member may be bent toward each of the battery cells connecting the heat dissipation member.

That is, heat generated from the battery cell is conducted to the heat dissipation member disposed between the battery cells and is easily transferred to a heat exchange member through the bent portion having a large contact area, thereby effectively dissipating heat from the battery cell.

According to circumstances, the battery module may be configured in a structure in which a heat exchange member is mounted at the bent portion of the heat dissipation member. The heat dissipation member may be mounted to the heat dissipation member in various manners, such as welding or mechanical coupling. Consequently, heat generated from the battery cell is transferred to the heat dissipation member disposed between the battery cells and is effectively removed by the heat exchange member mounted at one side of the battery cell stack.

The material for the heat exchange member is not particularly restricted so long as the heat exchange member is formed of a material exhibiting high thermal conductivity. Preferably, the heat exchange member is formed of a metal material exhibiting higher thermal conductivity and mechanical strength than other materials. The heat dissipation member and the heat exchange member may be connected to each other to achieve effective heat transfer.

Generally, a battery module is configured in a structure in which battery cells are stacked while being arranged at predetermined intervals to form coolant channels so that air flows (in an air cooling type) in the spaces defined between the respective battery cells to prevent overheating of the battery cells in a state in which temperature sensors are mounted in the spaces defined between the respective battery cells to measure the temperatures of the battery cells. However, this type of battery module does not provide a sufficient heat dissipation effect.

In a battery module in which a plurality of heat dissipation members is disposed at two or more interfaces between battery cells, and a heat exchange member to integrally interconnect the heat dissipation members is mounted at one side of a battery cell stack, on the other hand, it is possible to cool the battery cell stack with higher cooling efficiency than a conventional cooling system without the provision of spaces between the respective battery cells or although small spaces are provided between the respective battery cells, and therefore, it is possible to maximize heat dissipation efficiency of the battery module and to stack the battery cells with high integration.

In a preferred example, each of the battery cells may be a lightweight pouch-shaped battery including an electrode assembly mounted in a battery case formed of a laminate sheet including an inner resin layer which is thermally weldable, an isolation metal layer, and an outer resin layer exhibiting excellent durability.

Preferably, each of the battery cells is mounted in a battery cartridge configured in a frame structure. This structure is preferably applied to a battery having sealing portions formed at the edge of the battery by thermal welding.

In the above structure, the battery cartridge includes at least one pair of plate-shaped frames to fix the edge of a corresponding one of the battery cells in a state in which at least one major surface of the corresponding one of the battery cells is exposed, and each of the frames are provided at the outside thereof with elastic pressing members to fix a corresponding one of the heat dissipation members to the exposed major surface of the corresponding one of the battery cells in a tight contact manner.

Therefore, in a case in which a plurality of battery cartridges, in which battery cells are mounted, are stacked, and heat dissipation members are disposed between the respective battery cartridges, the elastic pressing members provided at the outsides of the frames increase structural stability of the battery cartridge stack and enable the heat dissipation members to be effectively fixed to the battery cartridge stack.

Since each of the battery cartridges includes at least one pair of plate-shaped frames, not only one battery cell but also two or more battery cells may be mounted in each of the battery cartridges. For example, in a structure in which two battery cells are mounted in each of the battery cartridges, a middle frame is provided between the battery cells such that one of the battery cells is disposed between the upper frame and the middle frame, and the other battery cell is disposed between the middle frame and the lower frame. Even in this structure, the heat dissipation members are disposed at the outsides of the respective battery cells in a tight contact manner, and therefore, it is possible to provide a heat dissipation effect through thermal conduction.

The structure of the elastic pressing members is not particularly restricted so long as the elastic pressing members are mounted to the frames to fix the heat dissipation members upon assembling the battery module. For example, the elastic pressing members may be provided at upper and lower ends and/or left and right sides of the frames.

Consequently, the heat dissipation members are effectively pressed against the frames by the elastic pressing members mounted to the outsides of the frames in a tight contact manner to increase a degree to which the heat dissipation members are fixed to the frames with the result that it is not necessary to use an additional member to fix the heat dissipation members.

According to circumstances, the elastic pressing members may be further mounted at the insides of the frames which are in contact with the sealing portions of the battery cells.

In a preferred example, each of the battery cells may be mounted between the frames in a state in which the exposed major surface of each of the battery cells protrudes outward from a corresponding one of the frames, and the elastic pressing members may be provided at the outsides of the frames in a state in which the elastic pressing members have a greater height than a protruding height of each of the battery cells at the exposed major surface thereof.

That is, the frames formed lower than the height of the battery cells fix only the edges of the battery cells, and therefore, it is possible to achieve effective heat dissipation through the protruding exposed major surfaces of the battery cells. Also, upon application of the heat dissipation members, the elastic pressing members mounted higher than the height of the battery cells at the protruding exposed major surfaces of the battery cells effectively press the heat dissipation members to the exposed major surfaces of the battery cells in a tight contact manner, and therefore, it is possible to increase overall mechanical strength of a battery module without increasing the size of the battery module using the heat dissipation members.

The material for the elastic pressing members mounted at the outsides of the frames is not particularly restricted so long as the elastic pressing members exhibit high elastic pressing force when the elastic pressing members are pressed. Preferably, each of the elastic pressing members is formed of an elastic polymer resin. Such a polymer resin may be a material that is capable of exhibiting high elastic force or may have a structure or shape that is capable of exhibiting high elastic force. A representative example of the former may be rubber, and a representative example of the latter may be foamed polymer resin.

The elastic pressing members may be mounted to the frames in various manners. In order to more efficiently mount the elastic pressing members to the frames, the frames may be provided at the outsides thereof with grooves, in which the elastic pressing members may be mounted.

Each of the elastic pressing members may have a width equivalent to 10% or more of the width of each of the frames. If the width of each of the elastic pressing members is too small as compared with the width of each of the frames, an effect obtained by mounting the elastic pressing members to the frames may not be exhibited. On the other hand, if the width of each of the elastic pressing members is too large as compared with the width of each of the frames, the elastic pressing members, which are elastically deformed when the elastic pressing members are pressed, cover large portions of the heat dissipation members with the result that a heat dissipation effect may be lowered. Furthermore, the elastic pressing members may protrude out of the frames when the elastic pressing members are pressed, which is not preferable. Of course, therefore, the width of each of the elastic pressing members may exceed the above defined range unless the above problems are caused.

Preferably, the heat exchange member has at least one coolant channel through which a coolant flows. For example, coolant channels, through which a coolant, such as water, flows, may be formed in the heat exchange member, thereby achieving an excellent cooling effect with high reliability as compared with a conventional air cooling type cooling structure.

As an example of the above structure, the heat exchange member may be configured in a structure including a bottom part, at the bottom surface of which heat dissipation members are disposed in a tight contact manner, opposite side parts connected to the bottom part, the opposite side parts having coolant channels formed therethrough in the longitudinal direction, and a plurality of heat dissipation fins disposed between the opposite side parts so that the heat dissipation fins extend upward from the bottom part.

Consequently, heat transferred from the battery cells to the heat dissipation members is conducted to the bottom surface of the bottom part of the heat exchange member and is transferred to the coolant flowing through the coolant channels formed in the opposite side parts of the heat exchange member, i.e. in a water cooling fashion, and to the heat dissipation fins of the heat exchange member, i.e. in an air cooling fashion, thereby effectively achieving the dissipation of heat from the battery cells.

The structure of the heat exchange member is not particularly restricted so long as the heat exchange member is mounted at one side of the battery cell stack to easily remove heat generated from the battery cells. Preferably, the heat exchange member is mounted at the top of a module case. Consequently, it is possible to dissipate heat generated from the battery cells to the outside of the module case with high efficiency.

According to circumstances, the module case may be provided at the top thereof with a depression part having a size sufficient to receive the heat exchange member, and the heat exchange member mounted in the depression part may have a height equal to or less than a height of the top of the module case. In this structure, even in a case in which a plurality of battery modules are stacked in the direction in which the heat exchange member is mounted, there is no difficulty in stacking the battery modules due to heat exchange member, and therefore, the above structure may be preferable in manufacturing a middle or large-sized battery pack having high power and large capacity Meanwhile, a middle or large-sized battery pack uses a plurality of battery cells in order to provide high power and large capacity. In battery modules constituting such a battery pack, higher heat dissipation efficiency is needed to secure safety of the battery pack.

In accordance with another aspect of the present invention, therefore, there is provided a middle or large-sized battery pack manufactured by combining two or more battery modules based on desired power and capacity.

The battery pack according to the present invention includes a plurality of battery cells in order to provide high power and large capacity. Consequently, the battery pack according to the present invention is preferably used as a power source for electric vehicles, hybrid electric vehicles, or plug-in hybrid electric vehicles in which high-temperature heat generated during the charge and discharge of the battery cells is a serious safety concern.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
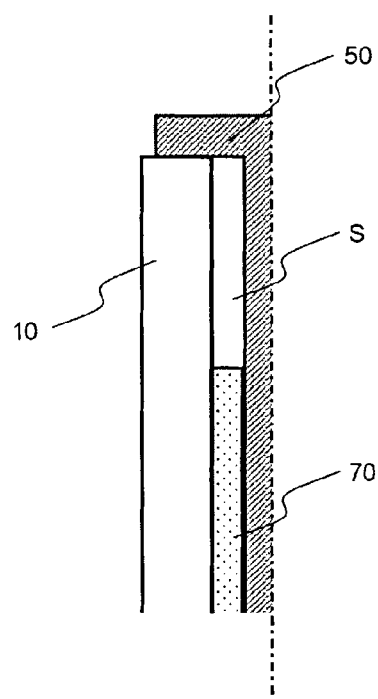
FIG. 1 is a partial vertical sectional view typically illustrating a battery module including a conventional heat dissipation member.

FIG. 1 is a partial vertical sectional view typically illustrating a battery module including a conventional heat dissipation member.

Referring to FIG. 1, the battery module includes a battery cell 10, a heat dissipation member 50 disposed opposite to the battery cell 10 and a temperature sensor 70.

The temperature sensor 70 is disposed between the battery cell 10 and the heat dissipation member 50. Also, the temperature sensor 70 is directly mounted to one side of the battery cell 10. As a result, a dead space S is provided between the battery cell 10 and the heat dissipation member 50. Direct contact between the battery cell 10 and the heat dissipation member 50 is difficult due to such a dead space S with the result that cooling efficiency is considerably lowered. Also, when external force is applied to the battery module, load concentrates on the temperature sensor 70 with the result that the temperature sensor 70 may be partially deformed or damaged.

Figure 2:
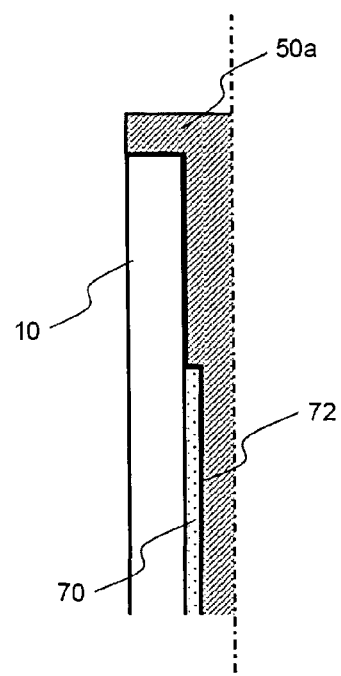
FIG. 2 is a partial vertical sectional view typically illustrating a battery module including a heat dissipation member according to an embodiment of the present invention.

FIG. 2 is a partial vertical sectional view typically illustrating a battery module including a heat dissipation member according to an embodiment of the present invention.

Referring to FIG. 2, a temperature sensor 70 to measure the temperature of a battery cell 10 is disposed between the battery cell 10 and a heat dissipation member 50a disposed in contact with the battery cell 10, in the same manner as in FIG. 1.

In this embodiment, however, a groove 72 having a shape corresponding to the temperature sensor 70 is formed at a region of the heat dissipation member 50a contacting the battery cell 10, and the temperature sensor 70 is disposed in contact with the outside of the battery cell 70 in a state in which the temperature sensor 70 is placed in the groove 72.

In the battery module of FIG. 2, therefore, no dead space S is provided as compared with the battery module of FIG. 1, and the direct contact area between the battery cell 10 and the heat dissipation member 50a is larger than the direct contact area between the battery cell 10 and the heat dissipation member 50 of FIG. 1. Consequently, the cooling efficiency of the battery cell 10 is improved, and the temperature sensor 70 is prevented from being deformed or damaged when external force is applied to the battery module.

Figure 3:
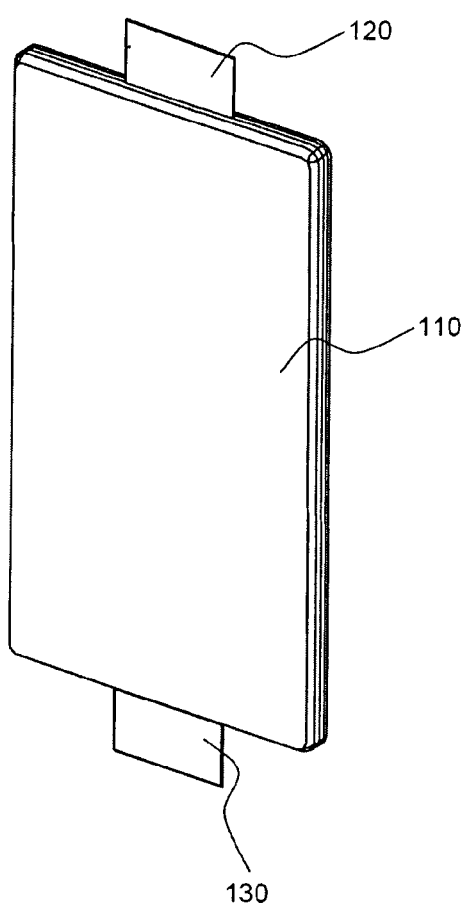
FIG. 3 is a typical view illustrating a plate-shaped battery cell.

FIG. 3 is a typical view illustrating a plate-shaped battery cell.

Referring to FIG. 3, a battery cell 100, which is a plate-shaped battery cell, includes an electrode assembly (not shown) of a cathode/separator/anode structure mounted in a battery case 110 formed of a laminate sheet including a resin layer and a metal layer. A cathode terminal 120 and an anode terminal 130, electrically connected to the electrode assembly, protrude outward from the upper end and the lower end of the battery case 110, respectively. For simplicity of illustration, a sealing portion formed at the edge of the battery case 110 by thermal welding is not shown.

Since the battery case 110 includes the resin layer, dissipation of heat from the battery cell is not easy as compared with a metal case. In particular, in a battery module including a plurality of stacked battery cells 100, performance and safety of the battery module may be deteriorated due to low heat dissipation.

Figure 4:
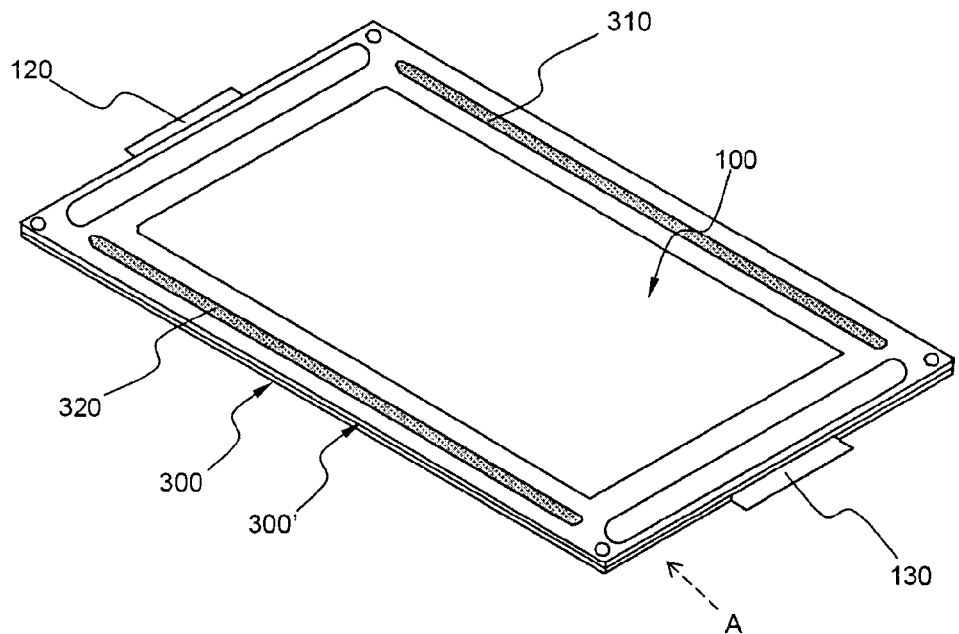
FIG. 4 is a typical plan view illustrating a battery cartridge.
Figure 5:
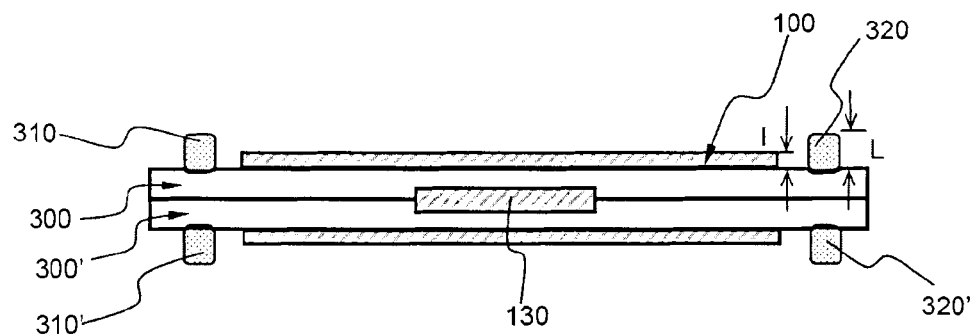
FIG. 5 is a vertical sectional view illustrating the battery cartridge of FIG. 4 when viewed in a direction A.

FIG. 4 is a typical plan view illustrating a battery cartridge according to an embodiment of the present invention, and FIG. 5 is a vertical sectional view typically illustrating the battery cartridge of FIG. 4 when viewed in a direction A.

Referring to these drawings, a battery cartridge 200 is configured in a structure in which a plate-shaped battery cell 100 is mounted in the battery cartridge 200, and electrode terminals 120 and 130 of the battery cell 100 protrude outward from the battery cartridge 200.

The battery cartridge 200 includes a pair of plate-shaped frames 300 and 300' configured to fix opposite sides of the battery cell 100 at the edge thereof in a state in which opposite major surfaces of the battery cell 100 are exposed.

The respective frames 300 and 300' are provided at left and right side parts of the outsides thereof with elastic pressing members 310, 320, 310' and 320', which extend in parallel in the longitudinal direction of the respective frames 300 and 300'.

Also, the battery cell 100 is mounted between the respective frames 300 and 300' in a state in which the exposed major surfaces of the battery cell 100 protrude from the respective frames 300 and 300'. The elastic pressing members 310, 320, 310' and 320' are mounted at the outsides of the respective frames 300 and 300' in a state in which the elastic pressing members 310, 320, 310' and 320' have a height L greater than a protruding height 1 of the battery cell 100 at the exposed major surfaces thereof. Upon application of heat dissipation members (not shown), therefore, it is possible for the elastic pressing members 310, 320, 310' and 320' to provide elastic pressing force with respect to the heat dissipation members (not shown). Also, the applied heat dissipation members (not shown) are effectively pressed to the exposed major surfaces of the battery cell 100 in a tight contact manner by the elastic pressing members 310, 320, 310' and 320', and therefore, it is possible to achieve effective heat dissipation without increasing the size of a battery module using the heat dissipation members.

Figure 6:
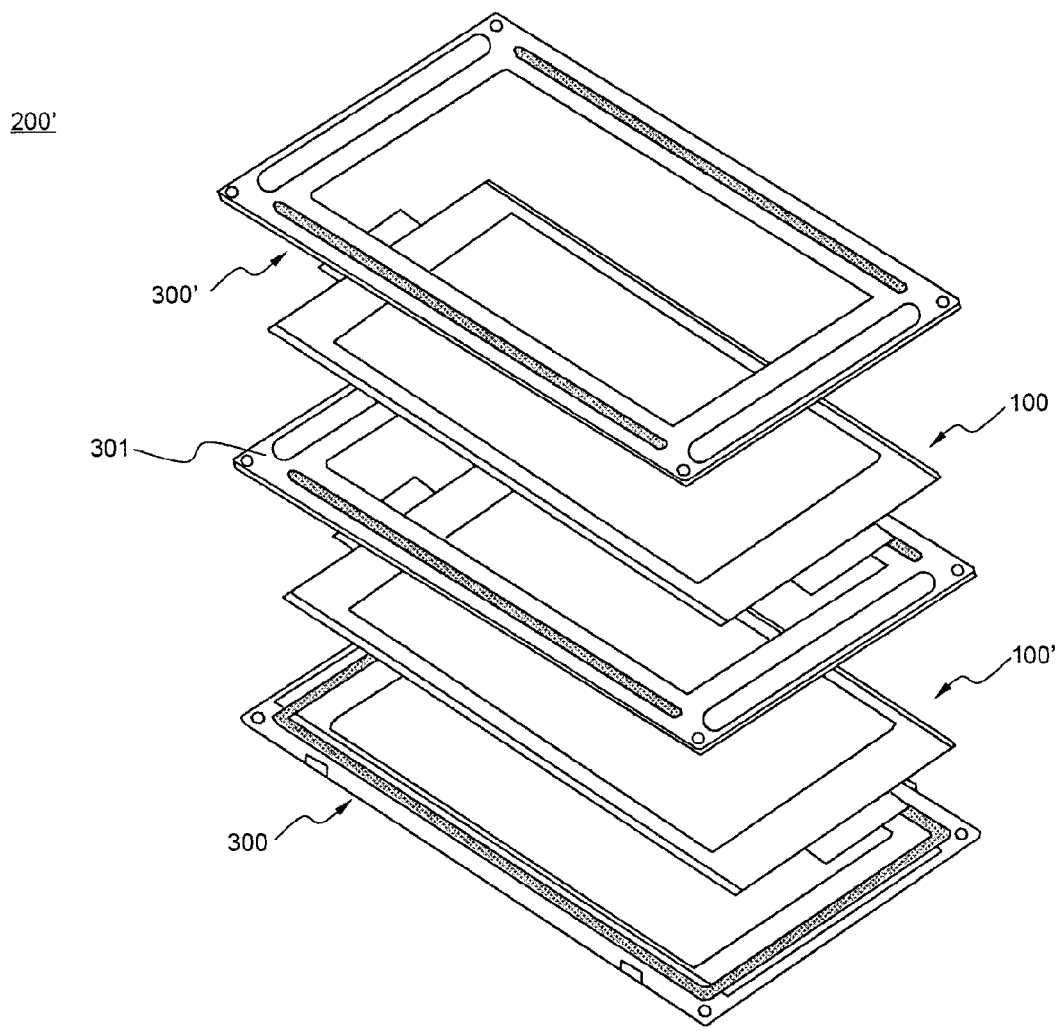
FIG. 6 is an exploded view illustrating a battery cartridge including two battery cells.
Figure 7:
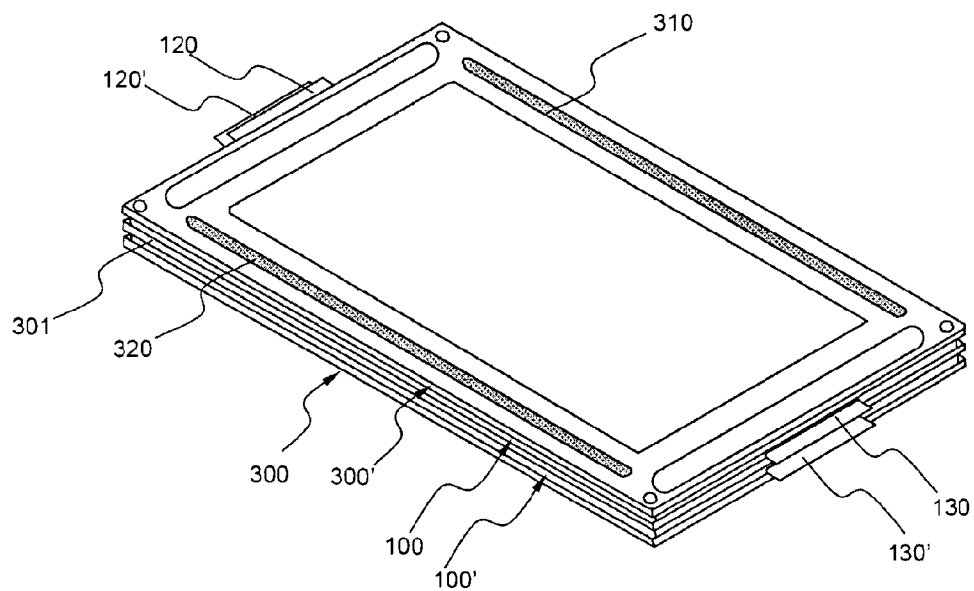
FIG. 7 is a typical plan view illustrating the battery cartridge of FIG. 6.

FIG. 6 is an exploded view typically illustrating a battery cartridge including two battery cells, and FIG. 7 is a typical plan view illustrating the battery cartridge of FIG. 6.

Referring to these drawings, a battery cartridge 200' is identical to the battery cartridge of FIG. 4 except that two plate-shaped battery cells 100 and 100' are mounted in the battery cartridge 200' in a stacked state, and a middle frame 301 is further provided between the battery cells 100 and 100', and therefore, a detailed description thereof will not be given.

In this structure, it is possible to achieve an excellent heat dissipation effect through thermal conduction even in a case in which heat dissipation members (not shown) are provided at the major surfaces of the battery cells 100 and 100'. As compared with the structure of FIG. 4, therefore, the heat dissipation members are pressed to the major surfaces of the battery cells 100 and 100' in a tight contact manner by elastic pressing members 310 and 320 provided at a pair of frames 300 and 300' and the middle frame 301, and therefore, it is possible to achieve effective heat dissipation while minimizing the increase in size of a battery module.

Figure 8:
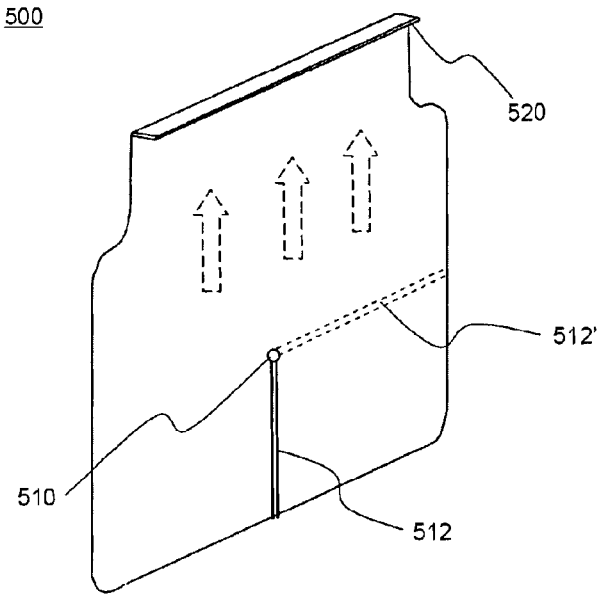
FIGS. 8 and 9 are typical views illustrating heat dissipation members according to other embodiments of the present invention.
Figure 9:
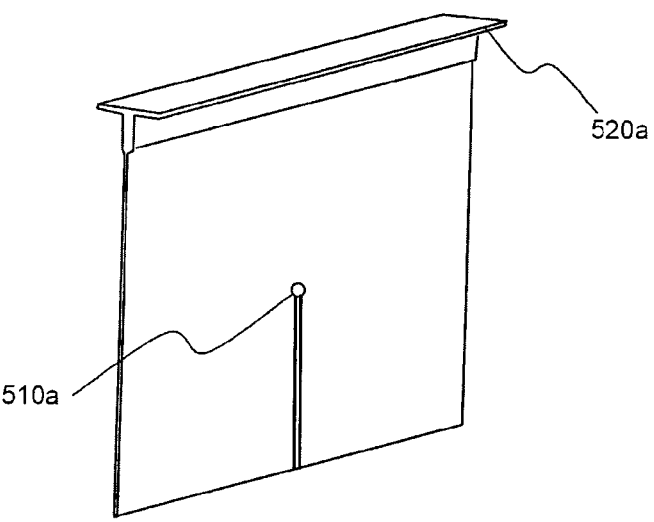

FIGS. 8 and 9 are typical views illustrating heat dissipation members according to other embodiments of the present invention.

Referring to FIG. 8, a heat dissipation member 500 is provided at one side thereof with a groove 510 formed in a shape corresponding to a temperature sensor so that the temperature sensor is mounted in the groove 510, and an outwardly exposed portion 520 is bent toward one side of the heat dissipation member 500.

The groove 510 is formed at a position corresponding to the center region of a battery cell (not shown). Also, a groove extension 512, in which a wire to electrically connect a temperature sensor (not shown) mounted in the groove 510 to a controller (not shown) is mounted, is formed at one side of the heat dissipation member 500 at which the groove 510 is formed.

When heat is conducted toward the outwardly exposed portion 520 of the heat dissipation member 500 (in the direction indicated by arrows), the groove extension 512 is formed in the opposite longitudinal direction. In this structure, heat conductivity is not lowered as compared with a groove extension 512' formed so as to traverse the thermal conduction direction.

A heat dissipation member 500a of FIG. 9 is different from the heat dissipation member 500 of FIG. 8 in that an outwardly exposed portion 520a is bent toward opposite sides of the heat dissipation member 500a. However, the heat dissipation member 500a of FIG. 9 is identical to the heat dissipation member 500 of FIG. 8 in that a groove 510a, in which a temperature sensor is mounted, is formed at one side of the heat dissipation member 500a in a shape corresponding to the temperature sensor.

Figure 10:
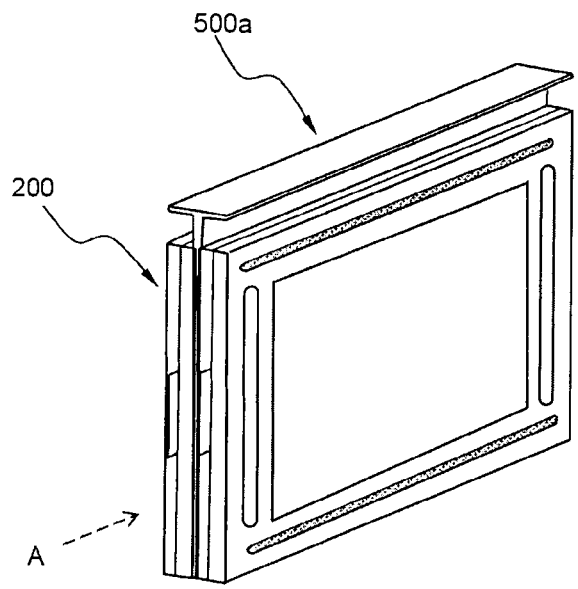
FIG. 10 is a typical view illustrating a structure in which the heat dissipation member of FIG. 9 is disposed between battery cartridges.
Figure 11:
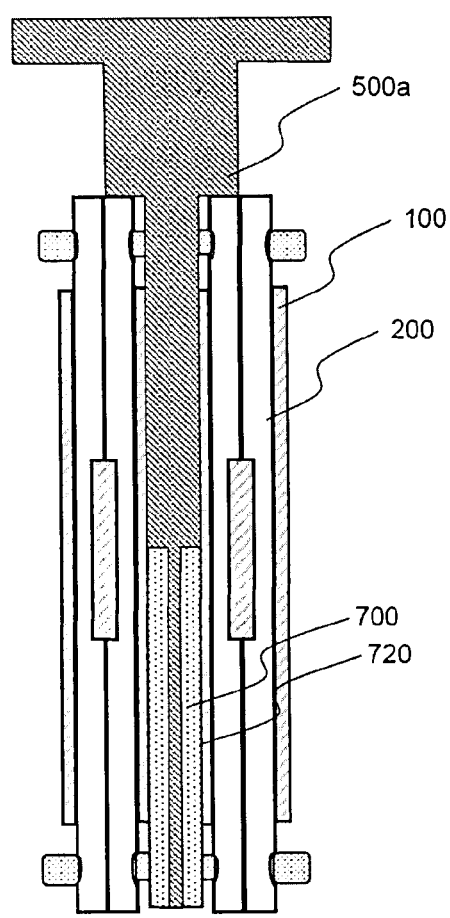
FIG. 11 is a typical vertical sectional view of FIG. 10 when viewed in a direction A.

FIG. 10 is a typical view illustrating a structure in which the heat dissipation member of FIG. 9 is disposed between battery cartridges, and FIG. 11 is a typical vertical sectional view of FIG. 10 when viewed in a direction A.

Referring to these drawings, battery cartridges 200 are disposed at opposite sides of the heat dissipation member 500a, and battery cells 100 are disposed in tight contact with the heat dissipation member 500a so that the battery cells 100 are cooled through thermal conduction. A groove 720 is formed at the lower part of the heat dissipation member 500a so that the groove 720 extend in the longitudinal direction opposite to the thermal conduction direction, and a temperature sensor 700 is mounted in the groove 720. As a result, a degree of tight contact and contact area between the heat dissipation member 500a and the battery cells 100 are increased.

If a groove, in which the temperature sensor 700 is mounted, is not formed at the heat dissipation member 500a as shown in FIG. 1, a dead space corresponding to the thickness of the temperature sensor 700 is provided between the battery cells 100 and the heat dissipation member 500a with the result that the cooling efficiency of the battery cells 100 is lowered.

Figure 12:
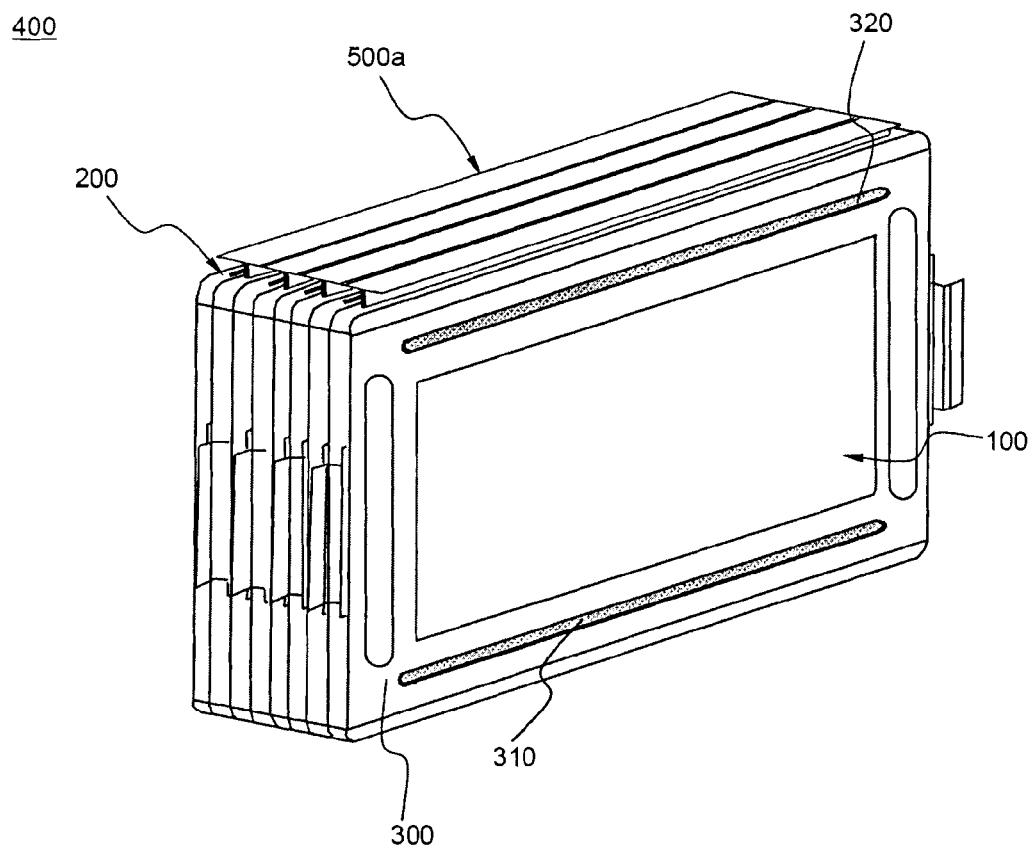
FIG. 12 is a perspective view illustrating a battery module in which heat dissipation members are disposed between battery cartridges, one of which is shown in FIG. 4.

FIG. 12 is a perspective view illustrating a battery module in which heat dissipation members are disposed between battery cartridges, one of which is shown in FIG. 4.

Referring to FIG. 12, a battery module 400 includes eight battery cartridges 200, which are sequentially stacked, and four heat dissipation members 500a are disposed at some interfaces between the battery cartridges 200 so that heat generated from the battery cartridges 200 (specifically, heat generated from the battery cells mounted in the respective battery cartridges) is conducted to the heat dissipation members 500a so as to achieve a high heat dissipation effect.

Elastic pressing members 310 and 320 provided at the outsides of the frames 300 of the eight battery cartridges 200 assist the heat dissipation members 500a to be stably mounted and fixed to the frames 300.

Meanwhile, the respective heat dissipation members 500a are made of metal sheets exhibiting high thermal conductivity. Outwardly exposed portions of the heat dissipation members 500a are bent toward opposite sides of the respective battery cartridges 200.

Consequently, heat generated from battery cells 100 during the charge and discharge of the battery cells 100 is transferred to the heat dissipation members 500a disposed between the respective battery cartridges 200 and is then discharged to the outside through a heat exchange member (not shown) disposed on the outwardly exposed portions of the heat dissipation members 500a, thereby achieving high heat dissipation efficiency while the battery module is configured in a compact structure.

Figure 13:
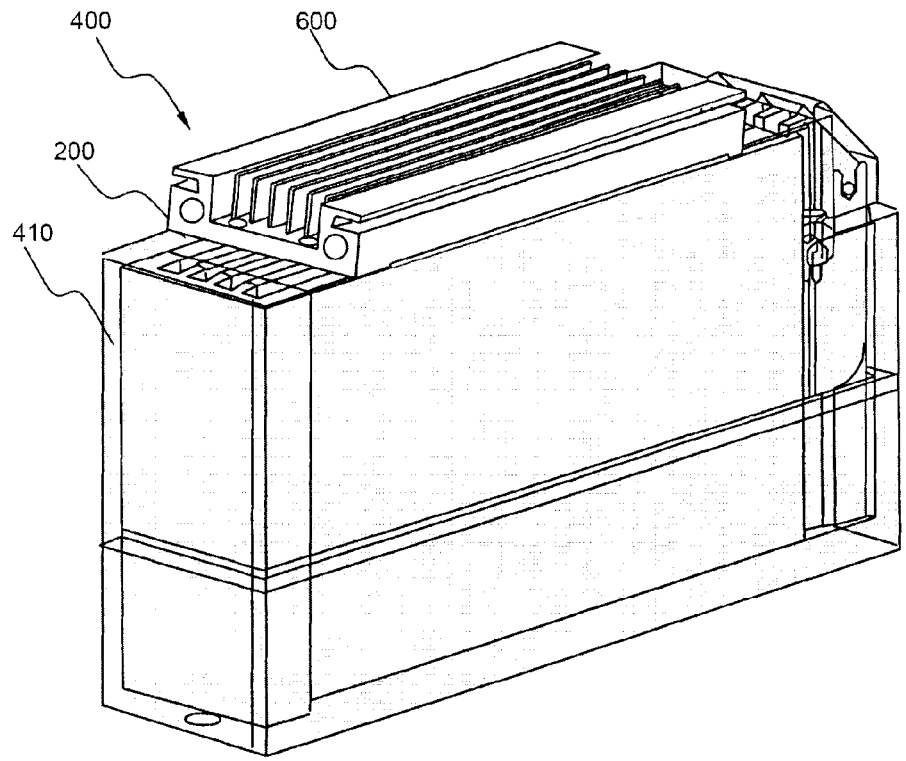
FIG. 13 is a perspective view illustrating a battery module to which a heat exchange member according to another embodiment of the present invention is mounted.
Figure 14:
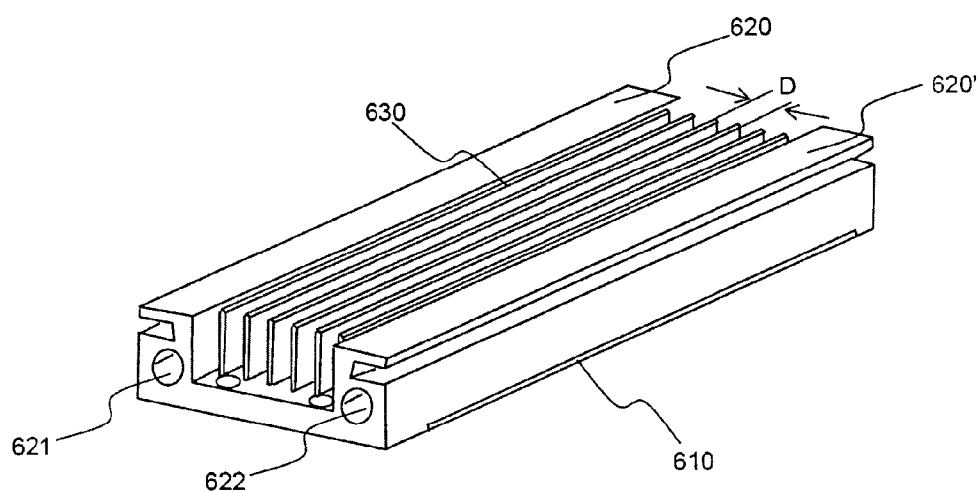
FIG. 14 is a typical enlarged view illustrating the heat exchange member of FIG. 13.

FIG. 13 is a perspective view typically illustrating a battery module to which a heat exchange member according to another embodiment of the present invention is mounted, and FIG. 14 is a typical enlarged view illustrating the heat exchange member of FIG. 13.

Referring to these drawings together with FIG. 12, a battery module 400 mounted in a module case 410 is configured in a structure in which a heat exchange member 600 is mounted at the top of a battery cartridge stack constituted by sequentially stacking a plurality of battery cartridges 200.

The heat exchange member 600 includes a bottom part 610 mounted at the top of the module case 410 so that heat dissipation members 500a are disposed at the bottom surface of the bottom part 610 in a tight contact manner, opposite side parts 620 and 620' connected to the bottom part 610, the opposite side parts 620 and 620' having coolant channels 621 and 622 formed therethrough in the longitudinal direction, and a plurality of heat dissipation fins 630 disposed between the opposite side parts 620 and 620' so that the heat dissipation fins 630 extend upward from the bottom part 610.

That is, a coolant, such as water, flows through the coolant channels 621 and 622, and the heat dissipation fins 630 are arranged at predetermined intervals D so that air flows between the respective heat dissipation fins 630. Consequently, heat transferred from the heat dissipation members 500a is effectively removed with high reliability and excellent cooling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured in a structure in which a groove is formed at a corresponding member contacting a battery cell to accelerate the dissipation of heat from the battery cell, and a temperature sensor is mounted in the groove. Consequently, it is possible to increase a degree of tight contact between the battery cell and the corresponding member and to prevent load from concentrating on a position at which the temperature sensor is mounted, thereby preventing the temperature sensor from being deformed and damaged.

Also, a water cooling type cooling structure is formed in a heat exchange member, and therefore, it is possible to further improve the dissipation of heat from the battery cell with high reliability. The internal temperature of the battery cell is uniformly controlled based on such high heat dissipation efficiency, thereby considerably improving lift span and safety of the battery cell.

The invention claimed is:

1. A battery module comprising:
   two or more battery cells;
   a heat dissipation member formed of a metal sheet, the heat dissipation member having a first side surface and a second side surface, the heat dissipation member mounted at an interface between the battery cells and contacting at least one of the battery cells;
   a groove formed in the heat dissipation member, the groove having a bottom surface spaced from a side surface of the heat dissipation member; and
   a temperature sensor to measure the temperature of the at least one of the battery cells disposed in the groove,
   wherein the temperature sensor is disposed in contact with an outside of the at least one of the battery cells when the temperature sensor is mounted in the groove,
   wherein the groove extends in a longitudinal direction opposite to a thermal conduction direction of the heat dissipation member,
   wherein the heat dissipation member is a cooling fin structure, and
   wherein the groove is formed in the heat dissipation member so that the temperature sensor is located at a center region of the at least one of the battery cells.

2. The battery module according to claim 1, wherein the heat dissipation member is disposed at the interface between the battery cells in which at least a portion of the heat dissipation member is exposed outward from the battery cells, and
   wherein the outwardly exposed portion of the heat dissipation member is bent toward one side of the at least one of the battery cells.

3. The battery module according to claim 2, wherein the outwardly exposed portion of the heat dissipation member is bent toward each of the battery cells connected to the heat dissipation member.

4. The battery module according to claim 2, further comprising a heat exchange member mounted at the bent portion of the heat dissipation member.

5. The battery module according to claim 4, wherein the heat exchange member has at least one coolant channel through which a coolant flows.

6. The battery module according to claim 5, wherein the heat exchange member comprises:
   a bottom part;
   heat dissipation members disposed at a bottom surface of the bottom part;
   opposed side parts connected to the bottom part, the opposed side parts having coolant channels formed therethrough in a longitudinal direction; and
   a plurality of heat dissipation fins disposed between the opposed side parts so that the heat dissipation fins extend upwardly from the bottom part.

7. The battery module according to claim 4, further comprising a module case,
   wherein the heat exchange member is mounted at a top of the module case.

8. The battery module according to claim 7, wherein a depression part having a size sufficient to receive the heat exchange member is provided at a top of the module case, and
   wherein the heat exchange member mounted in the depression part has a height equal to or less than a height of the top of the module case.

9. A middle or large-sized battery pack comprising:
   two or more battery modules, the number of the battery modules being set based on power and capacity of the battery pack,
   wherein the battery module comprises:
      two or more battery cells;
      a heat dissipation member mounted at an interface between the battery cells, the heat dissipation member formed of a metal sheet contacting at least one of the battery cells;
      a groove formed in a side surface of the heat dissipation member, the groove having a bottom surface spaced from the side surface of the heat dissipation member; and
      a temperature sensor to measure the temperature of the at least one of the battery cells disposed in the groove,
      wherein the temperature sensor is disposed in contact with an outside of the at least one of the battery cells when the temperature sensor is mounted in the groove,
      wherein the groove extends in a longitudinal direction opposite to a thermal conduction direction of the heat dissipation member,
      wherein the heat dissipation member is a cooling fin structure, and
      wherein the groove is formed in the heat dissipation member so that the temperature sensor is located at a center region of the at least one of the battery cells.

10. The middle or large-sized battery pack according to claim 9, wherein the battery pack is used as a power source for electric vehicles, hybrid electric vehicles or plug-in hybrid electric vehicles.

11. A battery module, comprising:
    a first battery cell;
    a second battery cells;
    a heat dissipation member located between the first battery cell and the second battery cell, the heat dissipation member having a first side surface and a second side surface;
    a groove formed in one of the side surfaces of the heat dissipation member, the groove having a bottom surface spaced inwardly from the side surface; and
    a temperature sensor retained within the groove,
    wherein the heat dissipation member is a cooling fin structure, and
    wherein the groove is formed in the heat dissipation member so that the temperature sensor is located at a center region of the at least one of the battery cells.

12. The battery module of claim 11, further comprising a groove formed in two side surfaces of the heat dissipation member; and
    a temperature sensor retained in each groove.

13. The battery module of claim 11, wherein the heat dissipation member has a top edge and a bottom edge, and
    wherein the groove extends in a direction from the bottom edge toward the top edge.

* * * * *